United States Patent [19]

McKelvey

[11] 4,451,321

[45] May 29, 1984

[54] FLEXIBLE VACUUM BAG

[75] Inventor: Harold E. McKelvey, Plymouth, Mich.

[73] Assignee: Shatterproof Glass Corporation, Detroit, Mich.

[21] Appl. No.: 466,970

[22] Filed: Feb. 16, 1983

[51] Int. Cl.³ .............................................. B32B 31/20
[52] U.S. Cl. ..................................... 156/382; 156/385; 24/30.5 R; 24/303; 40/600; 40/621; 220/230
[58] Field of Search .............. 156/285, 382; 24/201 B; 40/600, 621; 220/230

[56] References Cited

U.S. PATENT DOCUMENTS

| | | | |
|---|---|---|---|
| 2,959,832 | 11/1960 | Baermann | 40/621 |
| 2,996,416 | 8/1961 | Boicey et al. | 156/382 |
| 3,102,314 | 9/1963 | Alderfer | 40/621 |
| 4,287,015 | 9/1981 | Danner | 156/285 |

*Primary Examiner*—Caleb Weston
*Attorney, Agent, or Firm*—William E. Nobbe

[57] ABSTRACT

A flexible vacuum bag for use in the lamination of glass sheets with an interposed layer of thermoplastic material, said bag having one initially open edge through which the laminations are introduced, and magnetic means for sealing said open edge to render the bag airtight during the laminating process.

7 Claims, 6 Drawing Figures

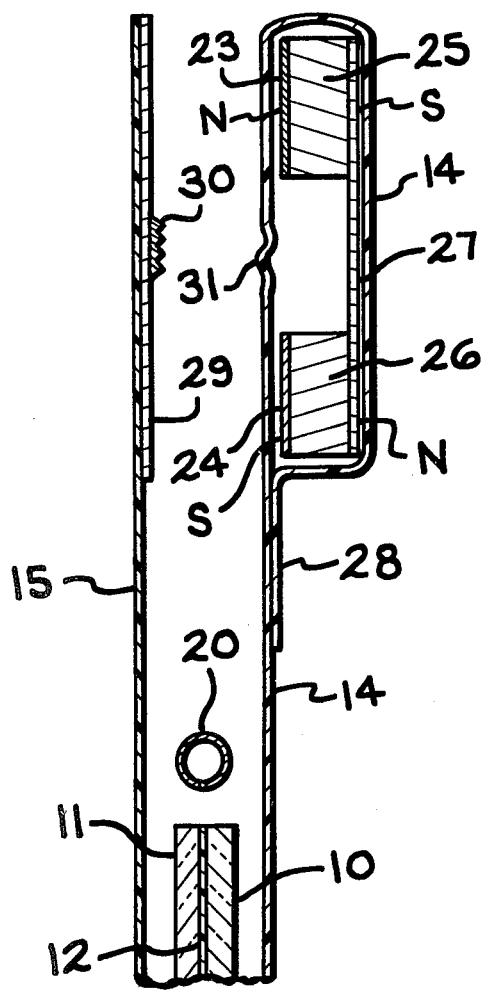
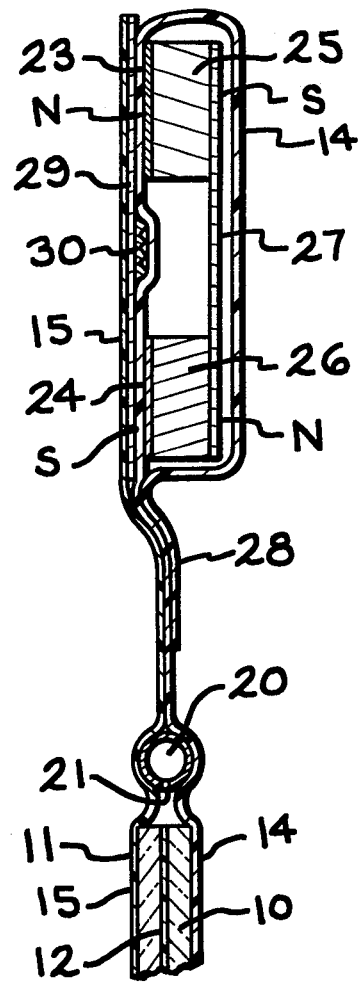
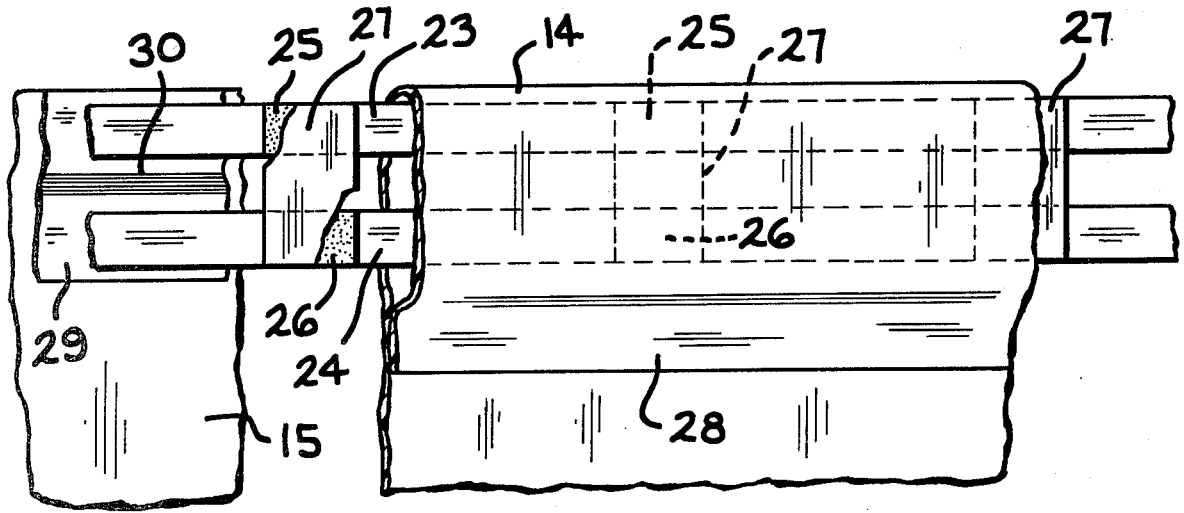

FLEXIBLE VACUUM BAG

FIELD OF THE INVENTION

The present invention relates to an improved flexible vacuum bag or container for use in the lamination of safety glass and, in particular, automobile windshields and the like.

BACKGROUND OF THE INVENTION

Automobile windshields ordinarily consist of two sheets of glass and an interposed layer of thermoplastic material, such as polyvinyl butyral, bonded to one another by heat and pressure to form a composite unit. The bonding is usually accomplished in a two-step operation by first subjecting the assembled laminations to a preliminary pressing to remove the air from between the laminations and effect superficial bonding thereof, and then to a final heating and pressing in an autoclave filled with oil or air to completely bond the laminations together.

In such method, it is essential that all of the air be removed from between the laminations during the preliminary or prepressing step and before they are introduced into the autoclave for final heating and pressing to prevent the formation of defects in the finished product.

To accomplish this, it is also essential that the flexible bag in which the laminations are contained be tightly sealed since an ineffective seal would permit air to seep into the bag and between the laminations which would result in the formation of air bubbles during subsequent cooling of the laminations after bonding in the autoclave.

However, it has been found that the means heretofore employed for sealing the bag have proven less than perfect and hence not consistently reliable to prevent leakage of air into the bag.

It is therefore an important object of the present invention to provide a flexible vacuum bag or container for receiving the assembled laminations that is provided with novel sealing means which will effect an assured hermetic seal.

Another object of the invention is to provide a flexible vacuum bag provided with magnetic means for sealing the same.

A further object of the invention is to provide a magnetic sealing means for the bag of such character that will not only provide a perfectly tight seal but which will also enable the bag to be reused.

Other objects and advantages of the invention will become apparent during the following description taken in connection with the accompanying drawings.

BRIEF DESCRIPTION OF THE DRAWINGS

FIG. 4 is a cross sectional view of the vacuum bag, with the glass-plastic assembly located therein, prior to sealing, taken substantially on line 4—4 of FIG. 2, FIG. 5 is a view similar to FIG. 4 but showing the bag sealed, and FIG. 6 is a detail view of the magnetic sealing means.

DETAILED DESCRIPTION

Figure 1:
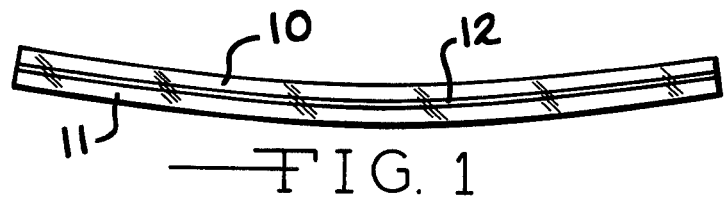
FIG. 1 is an end view of a glass-plastic assembly.

Referring to the drawings, there is illustrated in FIG. 1 a glass-plastic assembly representing an automobile windshield and composed of the two sheets of glass 10 and 11 and an interposed layer 12 of a thermoplastic material, such as polyvinyl butyral.

Figure 2:
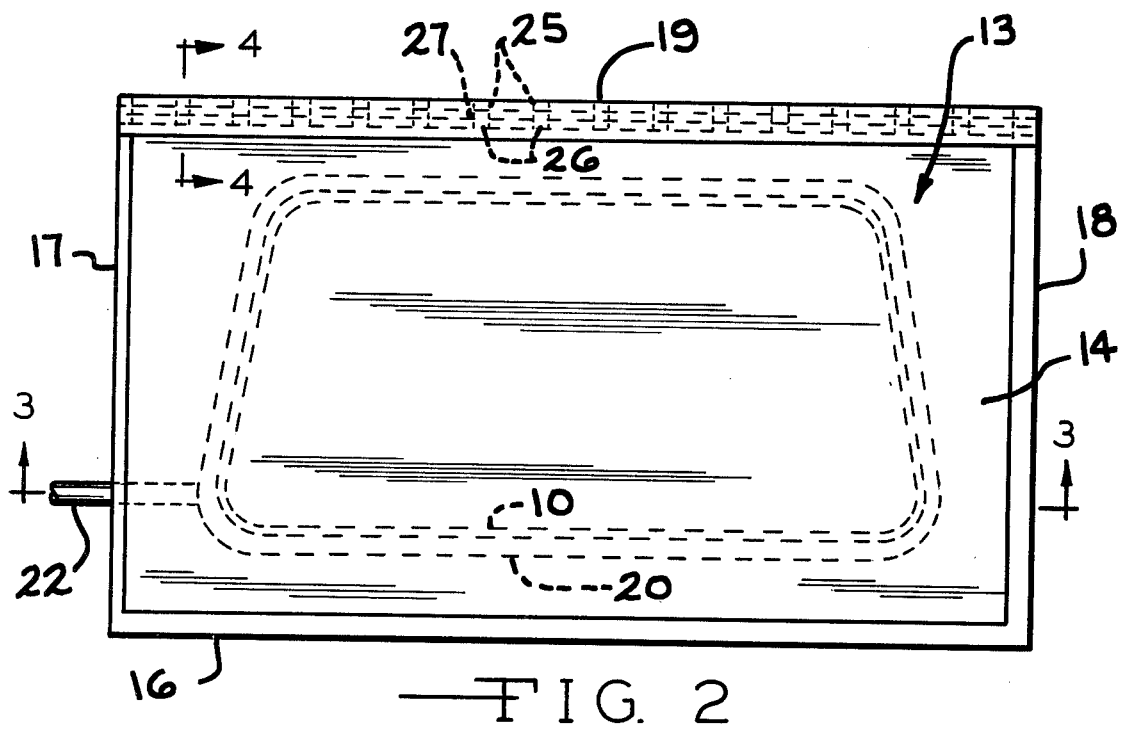
FIG. 2 is a front elevation of a flexible vacuum bag provided by the invention in which the glass-plastic assembly, indicated in broken lines, is processed.
Figure 3:
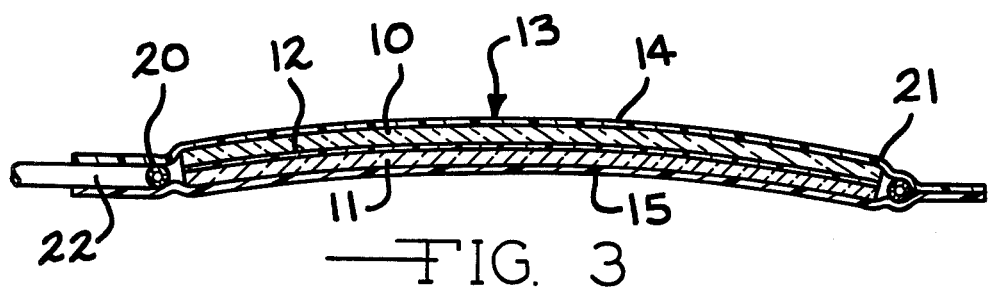
FIG. 3 is a cross sectional view taken substantially on line 3—3 of FIG. 2.

According to the invention, the three laminae 10, 11 and 12 are laid freely one upon the other in properly assembled relationship to form a sandwich and the assembly then introduced into the flexible vacuum bag 13 shown in FIGS. 2 and 3. The bag is usually substantially rectangular and formed of the two side panels 14 and 15 sealed together along one side edge 16 and the two end edges 17 and 18. The other side edge 19 is left open and forms the entrance through which the laminated assembly is introduced into the bag. The side panels 14 and 15 may be of any desired flexible material, such as polyvinyl alochol, and the three edges 16, 17 and 18 are permanently sealed together.

After the laminated assembly has been placed within the bag 13 through the open edge 19 a vacuum hose 20 is preferably arranged around the periphery of the assembly in spaced relation thereto. The hose 20 is provided with a series of openings 21 and is connected to a vacuum pump (not shown) through an outlet hose 22.

The bag panels 14 and 15 at the open edge 19 are then brought together and sealed and a vacuum established in the bag to withdraw the air not only from said bag but also from between the laminations. The present invention is, of course, not restricted to the particular means disclosed for withdrawing the air from the bag.

As noted above, and for the reasons stated, it is very important that the bag be tightly sealed during the prepressing operation. This is herein accomplished by a magnetic sealing means associated with the open side 19 of the bag 13. More specifically, the magnetic sealing means consists of two spaced, parallel flexible metal strips 23 and 24 preferably of spring steel positioned opposite the outer surface of the side panel 14 adjacent the open edge 19 of the bag and extending the length thereof.

Secured to the metal strips 23 and 24, in spaced relation, along the length thereof are two rows of permanent magnets 25 and 26 respectively with the magnets in the two rows being disposed opposite one another as shown in FIG. 6. Extending between and secured to opposite magnets 25 and 26 in the two rows are the metal shunt strips 27.

The metal strips 23 and 24, magnets 25 and 26 and shunt strips 27 are adhered to one another to form a magnetic unit and this unit is secured in position by wrapping the end portion of the side panel 14 around the unit and adhering the free end 28 thereof to the main portion of the side panel. However, if desired, the magnetic unit may be secured to the panel 14.

Secured to the inner surface of the side panel 15 is a single relatively wide metal strip 29, also preferably of spring steel, said strip being coextensive in length with the metal strips 23 and 24 and of a width equal to the combined widths of said metal strips 23 and 24 and the space between them.

Secured to the metal strip 29 opposite the open space between the metal strips 23 and 24 is a strip 30 of compressible sealing material such as silicon sponge material or the like which is coextensive in length with the metal strips 23 and 24. The flexible metal strips 23, 24 and 29 may be of any desired thickness, for example, 0.015 of an inch and will readily conform to the curvature of the windshield.

After the assembled laminations have been placed in the bag 13 through the open side 19 thereof, the free edges of the panels are brought together and the strip of sealing material 30 compressed against the side panel 14 as shown in FIG. 5. As disclosed in FIG. 4, the side panel 15 is preferably provided with a relatively small amount of excess material 31 between the metal strips 23 and 24 which will accomodate the sealing strip 30 and increase the sealing action when the side panels are brought together. When this is done, a magnetic field will be established which will set up a strong attraction between the metal strips 23 and 24 and the metal strip 29 such as to maintain the strip of sealing material in tight sealing engagement with the bag panel 14. Thus, an assured hermetic seal will be achieved which will prevent the entry of air into the bag and between the laminations during prepressing.

After the bag has been sealed and a vacuum applied the laminations are subjected to a heating operation, preferably in an oven, to soften the thermoplastic interlayer 12 and cause it to adhere to the glass sheets 10 and 11. After prepressing has been completed, the bag is removed from the oven and introduced into an autoclave for final processing. The vacuum may or may not be continued in the autoclave.

The magnetic means are such that after autoclaving and cooling of the laminations the temporarily sealed edges of the side panels can be readily pulled apart to permit removal of the laminated unit and the bag used to process another glassplastic assembly.

It will be understood that various changes and modifications may be made without departing from the spirit or scope of the appended claims.

I claim:

1. A flexible vacuum bag for use in the lamination of glass sheets with an interposed layer of thermoplastic material, comprising opposite flexible side panels secured together along their edges but having one side edge open to receive the laminations, and magnetic means for sealing said initially open edge to render the bag airtight, said magnetic means including a pair of spaced, parallel, flexible metal strips disposed opposite the outer surface of one of said panels, two rows of permanent magnets secured in spaced relation along said strips, with the magnets in the two rows disposed opposite one another, means magnetically connecting the opposite magnets in the two rows, and a flexible metal strip secured to the inner surface of the second panel opposite the metal strips on the first panel.

2. A flexible vacuum bag as claimed in claim 1, including sealing means carried by said second panel and engaging said first panel between said metal strips on the first panel when the bag is closed.

3. A flexible vacuum bag for use in the lamination of glass sheets with an interposed layer of thermoplastic material, comprising opposite flexible side panels secured together along their edges but having one edge open to receive the laminations, and magnetic means for sealing said initially open edge to render the bag airtight, said magnetic means including flexible metal strips carried by said panels opposite one another, and a plurality of individual permanent magnets carried by the metal strips on one of said panels.

4. A flexible vacuum bag as claimed in claim 3, including a sealing material secured to one of said panels and engaging the other panel in sealing relation when the bag is closed.

5. A flexible vacuum bag for use in the lamination of glass sheets with an interposed layer of thermoplastic material, comprising opposite flexible side panels secured together along their edges but having one edge open to receive the laminations, and magnetic means for sealing said initially open edge to render the bag airtight, said magnetic means including a pair of spaced, parallel, flexible metal strips disposed opposite the outer surface of one of said panels, permanent magnets secured in spaced relation along said strips, with the magnets on the two strips being disposed opposite one another, shunt strips secured to the opposite magnets, a flexible metal strip secured to the inner surface of the second panel opposite the metal strips on the first panel and coextensive in length therewith, and a strip of sealing material secured to the metal strip on the second panel and engaging the first panel when the bag is closed.

6. A flexible vacuum bag as claimed in claim 5, in which the bag panels are formed of a plastic material.

7. A flexible vacuum bag as claimed in claim 5, including means for withdrawing the air from said bag after sealing.

* * * * *